(No Model.) 3 Sheets—Sheet 1.
W. MASON.
MAGAZINE FIREARM.
No. 548,715. Patented Oct. 29, 1895.
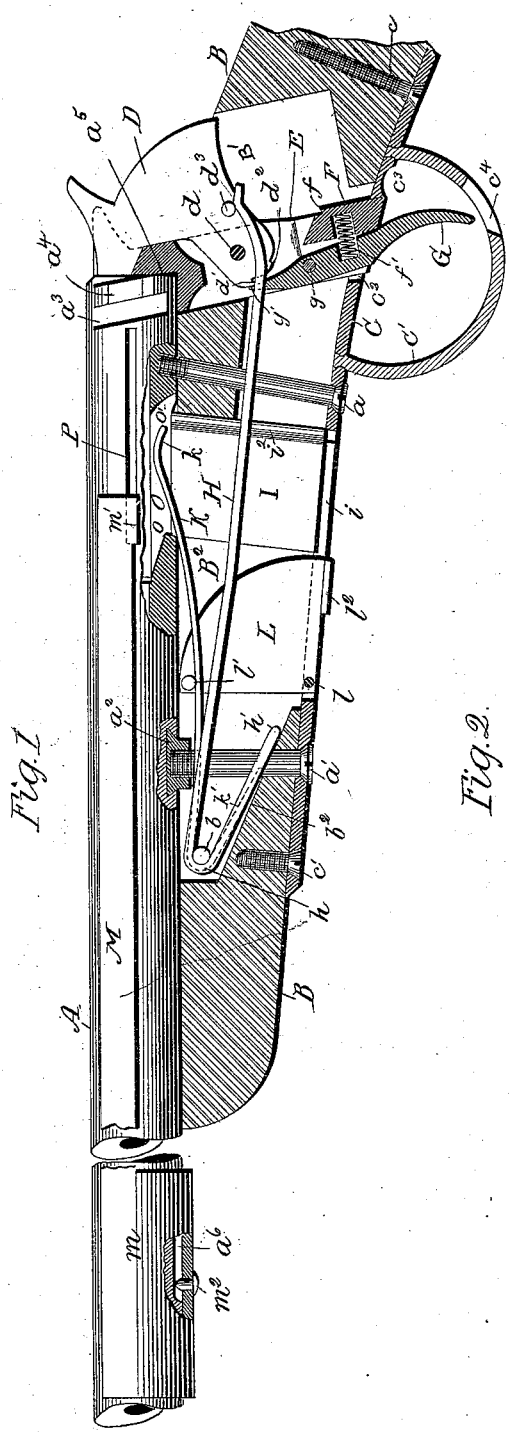
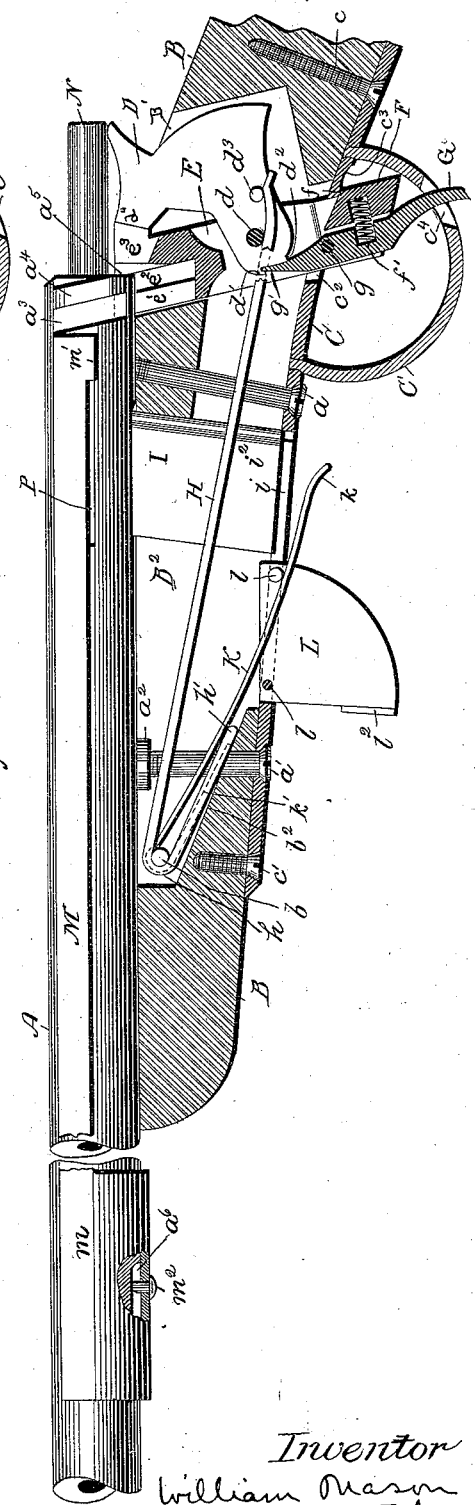
Witnesses:
Chas. B. Shumway
W. Lloyd Kitchel
Inventor
William Mason
by Robinson & Fisher
his attorneys (No Model.) W. MASON. 3 Sheets—Sheet 2.
MAGAZINE FIREARM.
No. 548,715. Patented Oct. 29, 1895.
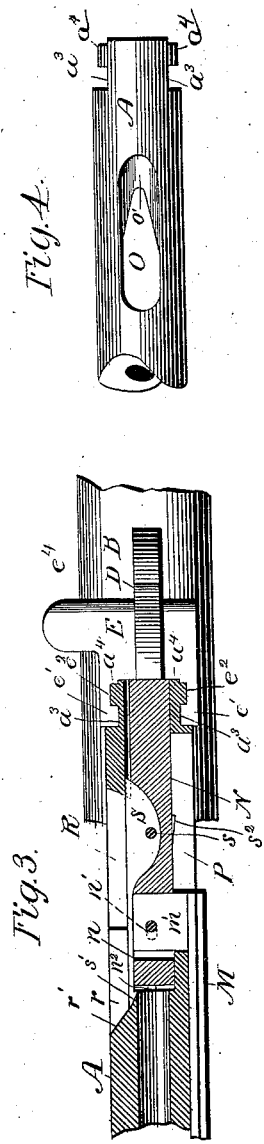
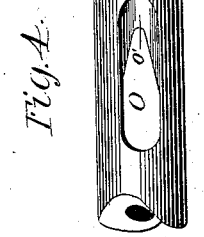
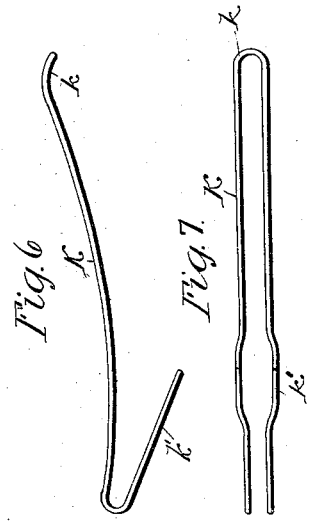
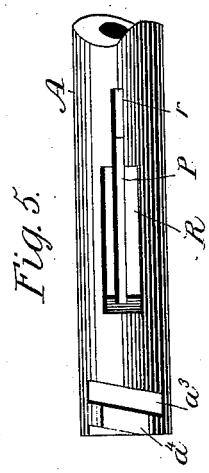

(No Model.) 3 Sheets—Sheet 3.
W. MASON.
MAGAZINE FIREARM.
No. 548,715. Patented Oct. 29, 1895.
Fig. 9.  Fig. 10.  Fig. 11.
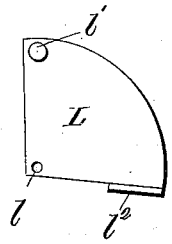
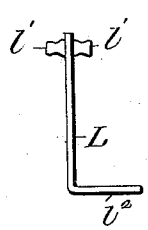
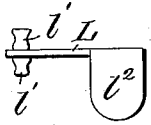
Fig. 12.
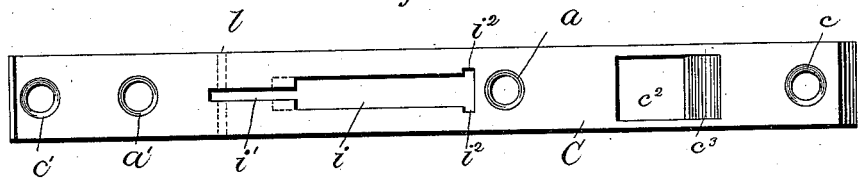
Fig. 13.
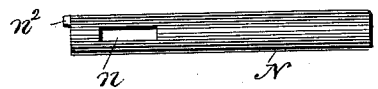
Fig. 14.  Fig. 15.
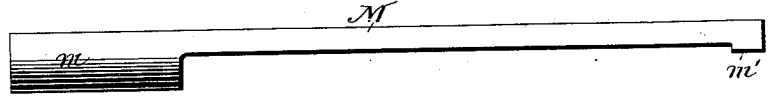
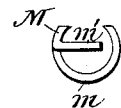
Fig. 16.  Fig. 17.
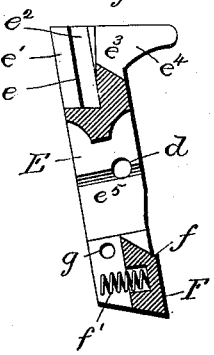
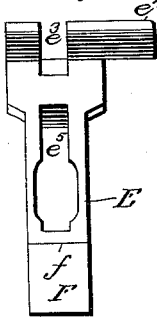
Witnesses:
Chas. B. Shumway
Wm. Lloyd Kitchel
Inventor
William Mason
by Robinson & Fisher
his attorneys.

UNITED STATES PATENT OFFICE.

WILLIAM MASON, OF NEW HAVEN, CONNECTICUT, ASSIGNOR TO THE WINCHESTER REPEATING ARMS COMPANY, OF SAME PLACE.

MAGAZINE-FIREARM.

SPECIFICATION forming part of Letters Patent No. 548,715, dated October 29, 1895.

Application filed March 6, 1895. Serial No. 540,762. (No model.)

*To all whom it may concern:*

Be it known that I, WILLIAM MASON, a citizen of the United States, and a resident of the city of New Haven, county of New Haven, State of Connecticut, have invented a new and useful Improvement in Repeating Breech-Loading Firearms, which is fully set forth in the following specification, taken in connection with the drawings, which form a part thereof, and in which the same letters of reference represent like parts in all the figures.

Figure 1 is a gun embodying this invention, shown partly in side elevation and partly in longitudinal section; Fig. 2, a similar view showing the carrier mechanism drawn downward for charging the magazine and the recoil-block open; Fig. 3, a horizontal section; Fig. 4, a bottom view of barrel detached; Fig. 5, a side elevation of barrel; Figs. 6 and 7, detail views of the carrier taken in side elevation and plan, respectively; Fig. 8, a bottom view of the main spring; Figs. 9, 10, and 11, side, end, and bottom views of the carrier-operating lever; Fig. 12, a bottom view of lower tang; Fig. 13, a side elevation of the combined firing-pin and breech-bolt; Figs. 14 and 15, side and end elevations of the action-handle; Figs. 16 and 17, vertical section and rear end elevation of recoil-block.

This invention relates to repeating breech-loading firearms of the box magazine-gun type, and has for its object the production of a cheap, reliable gun and the adaptation of a box magazine to the style of breech-loading firearm described in Letters Patent No. 511,633, granted December 26, 1893, to W. Mason.

With these objects in view the improvements in this invention consist in a simple effective carrier mechanism, a breech-bolt and action-handle, and minor improvement, set forth and claimed hereinafter.

In the drawings, A represents the barrel, B the stock, and C the lower tang, secured to the stock by the screws $c$ and $c'$ and to the barrel by the screws $a$ and $a'$ passing through the stock and engaged in the barrel or stud $a^2$, dovetailed in a transverse slot in the same.

The recoil-block E, hammer D, and trigger G within the chamber B' in the stock resemble, generally, the corresponding parts in Patent No. 511,633 and need here nothing more than reference to the parts designating the differences in construction in the adaptation of the gun to the box-magazine type. The butt-end of the barrel has on either side a vertical groove $a^3$, formed by the corresponding ribs $a^4$, inclined upwardly toward the fore-end of the gun. The elongated recoil-block E, having the recess $e$, with the inclined flanges $e'$ forming grooves $e^2$ on either side of said recess, is adapted to have an inclined sliding movement and interlock with the butt-end of the barrel when in its upward position. An elongated opening $e^5$ in the lower part of said recoil block has within it, pivoted at $d$, the hammer D, and at $g$ the trigger G, to engage with each other by means of the half-cock notch $d'$ and full-cock notch $d^2$ and end $g'$ of the trigger. A spiral spring $f'$, received in a counterbore in the trigger and in the portion F of the recoil-block, constantly presses against the lower end of the trigger to force the end $g'$ into engagement with hammer when opposite the notches $d'$ and $d^2$.

The lower tang C has the opening $c^2$ formed therein, through which the recoil-block passes, and a guard C', riveted thereto, with the opening $c^4$ in a line with the lower end of the trigger G for the trigger to pass through when the recoil-block is depressed by pressure on the thumb or finger plate $e^4$, extending laterally from the top of said recoil-block. A rearward extension $e^8$ of the recess $e$ of the recoil-block admits the point $d^4$ of the hammer to allow it to strike against the breech-bolt N, described hereinafter. A mainspring H, extending into the chamber B² in the forward end of the stock B, consists of a rod looped at $h'$, bent back on itself at $h$, bearing with its two free ends on the horizontal pin $d^3$ in the hammer. The pin $d$, upon which the hammer is pivoted in the recoil-block, has a slight clearance above said spring until the recoil-block is forced downward by pressure on the thumb-plate $e^4$. In operation the hammer is half-cocked and the recoil-block depressed against the tension of the spring H until the notch $f$ on the rear of said recoil-block engages with the edge $c^3$ in the lower tang to hold it in its open position during loading.

The narrowing of the lower end of the ribs $a^4$ on the barrel, as shown at $a^5$, allows the recoil-block a limited play about the pin $d$ when pressing against the mainspring H, which permits a slight movement of the thumb-plate $e^4$ to engage and disengage the notch $f$ with and from the edge $c^3$. The recoil-block is therefore returned after loading by pressure on the thumb-plate $e^4$, instead of on the projecting portion, as in the patent already cited.

The mainspring H is bent about a pin $b$ in the chamber $B^2$, and its looped end $h'$ bears against the inclined face $b^2$ of said chamber. About the same pin $b$ is bent the carrier K, consisting of a wire looped at $k$, which looped end extends into the magazine I for the reception of cartridges. Its free ends $k'$ likewise bear against the inclined face $b^2$, thus forming a carrier and carrier-spring combined.

An opening $i$ in the part of the lower tang C, forming the bottom of the magazine I, is for the admission of cartridges. Transverse grooves $i^2$, extending vertically in the rear of said magazine from the opening $i$ to the barrel, retain the flanged head of a cartridge, allowing it only vertical motion.

An operating-lever L, consisting of a metal piece in the form of a quadrant, is pivoted at the angle formed by the two sides ($l$) within a narrow prolongation $i'$ of the opening $i$.

At the end of the vertically-extending radius of the quadrant the laterally-projecting studs $l'$ scored, as shown in Figs. 10 and 11, hold the carrier, which passes on either side. A finger-piece $l^2$, extending laterally from the lower side of said operating-lever, projects through the prolongation $i'$. When the finger-piece $l^2$ is pressed downward, the operating-lever is turned on its pivot $l$, the studs $l'$ drawing the carrier K down against the tension of the spring $k'$ until the looped end $k$ projects through the under opening $i$, and a cartridge may be fed into the magazine above said looped end. Upon the release of the finger-piece $l^2$ the tension of the spring $k'$ forces the looped end $k$ of the carrier K upward, pressing the cartridge held by its flanged head in the grooves $i^2$ upward to the opening O in the under side of the barrel. This opening O in the barrel has its ends $o$ and $o'$ inclined inwardly toward the fore-end of the gun, and the rear end and adjacent portion of the sides incline sufficiently over the grooves $i^2$, so that the rear end of a cartridge pressed upward by the carrier K will be detained slightly until the fore-end is raised to slip easily into the barrel.

Within the butt-end of the barrel the breech-bolt N, of cylindrical form, combines with it the properties of a firing-pin by means of a slight end projection $n^3$, which in the drawings is adapted for rim fire, but may, obviously, by slight alteration, be adapted for central fire.

The action-handle M, extending longitudinally at the side of the barrel, is constructed with the portion $m$ to partially surround the barrel and has a lip $m'$, which projects through an elongated lateral slot P in the barrel and engages in a horizontal slot $n$ in the breech-bolt N.

The slot $n$ is slightly longer than the width of the lip $m'$, and the pin connecting the two is loosely engaged in the bearings $n'$ in the breech-bolt, allowing the bolt a slight longitudinal play in its connection with the action-handle. The action-handle M is prevented from turning about the barrel A by a screw $m^2$ engaging in a longitudinal recess $a^6$ in the barrel.

The extractor S, connected to the breech-bolt at $s$, extends into the prolongation $r$ with its inclined fore-end $r'$ of the opening R, and with its notch $s'$ engages the rim of the cartridge, and upon the rearward movement of the breech-bolt draws the cartridge rearward against an ejector pin or notch $s^2$ in the barrel and by means of said notch turns the cartridge about and ejects it through the opening R.

When the hammer D has been half cocked and the recoil-block depressed, as described above, the rearward movement of the action-handle is communicated to the breech-bolt by means of the lip $m'$ and to the extractor by its connection with the breech-bolt and ejects the spent cartridge. A fresh cartridge is pressed into the barrel when the breech-bolt is withdrawn by means of the carrier K, and the forward movement of the action-handle and breech-bolt connected thereto forces said cartridge into its chamber. The forward movement of the action-handle is limited by the slot P through which the lip $m'$ projects, and when limited by the slot the firing-pin and breech-bolt are not drawn sufficiently forward to impinge against the cartridge and discharge the gun. Upon the closing of the recoil-block and release of the hammer the breech-bolt is driven still farther forward by means of its loose connection with the action-handle, and the firing-pin may thereupon impinge against and discharge the cartridge. The details of this construction may be varied somewhat without departing from the spirit of my invention; but

What I claim is—

1. The combination in a breech loading box magazine gun with a chamber beneath the barrel thereof; of a combined part comprising a spring having one end looped to form a carrier, and the other end adapted to bear against a face of said chamber, said combined part being pivoted to swing in a vertical plane; and a lever pivoted within said chamber connected with said combined part to operate the same, substantially as described.

2. In a repeating breech loading box magazine gun, the combination within the stock thereof, with a chamber having a passage in the underside thereof; of a spring bent about a horizontal pin in said chamber, having its upper end looped to form a carrier, its lower end bearing against a face of said chamber, and an operating lever pivoted within said chamber to swing in a vertical plane, bearing by a pin on said carrier and projecting through said under passage in said chamber, substantially as described.

3. In a breech loading fire arm the combination with the barrel with a lateral opening; of a breech bolt in the barrel slotted horizontally; and an action handle capable of longitudinal movement having a lip extending through said lateral opening in the barrel and engaging with the slot in said breech bolt, substantially as described.

In witness whereof I have hereunto set my hand this 1st day of March, 1895.

WILLIAM MASON.

Witnesses:
DANIEL H. VEADER,
WILLIAM S. BALDWIN.